United States Patent [19]  [11] Patent Number: 4,876,146
Isaka et al.  [45] Date of Patent: Oct. 24, 1989

[54] ANTI-FOGGING MULTILAYERED FILM AND BAG PRODUCED THEREFROM FOR PACKAGING VEGETABLES AND FRUITS

[75] Inventors: Tsutomu Isaka; Saburo Ohta, both of Inuyama, Japan

[73] Assignee: Toyo Boseki Kabushiki Kaisha, Osaka, Japan

[21] Appl. No.: 43,959

[22] Filed: Apr. 29, 1987

[30] Foreign Application Priority Data

May 1, 1986 [JP] Japan ................... 61-101741
Jul. 8, 1986 [JP] Japan ................... 61-160529
Jul. 8, 1986 [JP] Japan ................... 61-160530

[51] Int. Cl.$^4$ .............................................. B32B 27/08
[52] U.S. Cl. ......................... 428/347; 428/349; 428/411.1; 428/516; 428/522; 428/523; 428/35.2; 428/910
[58] Field of Search ............... 426/415, 127, 106, 419; 428/500, 516, 522, 523, 349, 347, 910, 411.1, 35.2

[56] References Cited

U.S. PATENT DOCUMENTS

| | | | |
|---|---|---|---|
| 4,001,443 | 1/1977 | Dave | 426/419 |
| 4,066,811 | 1/1978 | Naito | 426/415 |
| 4,224,347 | 9/1980 | Woodruff | 426/415 |
| 4,341,825 | 7/1982 | Kemski | 428/349 |
| 4,486,552 | 12/1984 | Niemann | 524/376 |
| 4,565,738 | 1/1986 | Purdy | 428/349 |
| 4,671,987 | 6/1987 | Knott, II; et al. | 428/516 |

Primary Examiner—Ellis P. Robinson
Assistant Examiner—James J. Seidleck
Attorney, Agent, or Firm—Wegner & Bretschneider

[57] ABSTRACT

An anti-fogging multilayered film suitable for packaging fresh vegetables and fruits comprising a base layer and at least one surface layer containing an anti-fogging agent, said film having a water vapor transmission of 15 to 200 g/m$^2$·24 hrs·40° C., an oxygen permeability of 3,000 to 35,000 cc/m$^2$·24 hr·atm·20° C.·90% RH, and a carbon dioxide permeability of 12,000 to 130,000 cc/m$^2$·24 hr·20°C.·90% RH, and said anti-fogging surface layer having heat sealing properties. A packaging bag produced from this film is also disclosed.

8 Claims, 3 Drawing Sheets

ANTI-FOGGING MULTILAYERED FILM AND BAG PRODUCED THEREFROM FOR PACKAGING VEGETABLES AND FRUITS

FIELD OF THE INVENTION

The present invention relates to an anti-fogging multilayered film and a bag produced therefrom for packaging vegetables and fruits. More particularly, the anti-fogging multilayered film and the bag of the present invention are suitable for packaging fresh products which maintain their vital physiological activities even after harvesting, such as vegetables, roots, fruits, flowers, blossoms, mushrooms and the like (hereinafter simply referred to as "vegetables and fruits"). And, the film and the bag effectively exhibit improved function for keeping packaged products fresh upon storage as well as improved anti-fogging properties to enhance commercial value of packaged products. Although the multilayered film is not limited to use as a packaging material and it can be also used for other various purpose such as covering and divider materials for a greenhouse and the like, the following description are mainly referred to the use thereof as a packaging material.

BACKGROUND OF THE INVENTION

Recently, production of many vegetables and fruits such as fresh vegetable, fruits, flowers and the like has been shifted from open-field culture to planned multiple and diversified culture by using horticultural facilities. Therefore, there are many cases that a large amount of vegetables and fruits must be harvested and packaged within a certain fixed period. Further, even in the case of vegetables and fruits predominantly produced by open-field culture, it is necessary to package and ship a large amount of harvested products within a short period because they have fixed harvest season. In this regard, a major problem during distribution of packaged products to consumers is how to keep vegetables and fruits fresh as just after they have been harvested.

In order to solve the problem, improvement of packaging films and bags for keeping packaged products fresh has been studied intensively and various packaging materials has been proposed.

By the way, the above-described vegetables and fruits do not lose their vital physiological activities immediately after harvesting, but they maintain almost the same activities as just after they have been harvested for a while. And, when they are kept in a proper storage state, their physiological activities can be maintained for a much longer period. As far as such physiological activities are maintained, they are kept in very fresh. In other words, when storage conditions are improper, their physiological activities can not be maintained and they are rotten in a early stage of storage.

As physiological activities of vegetables and fruits in a packaged state, the following phenomena are known:

(1) decrease in water due to transpiration;
(2) consumption of atmospheric oxygen and production of carbon dioxide due to respiration; and
(3) rise in temperature due to production of carbon dioxide and heat generation. Therefore, in a closed state, oxygen content is decreased with increasing in carbon dioxide content, and the inner temperature of a package rises because heat dispersion is inhibited. And, since respiration becomes more active at a certain temperature or higher, the packaged products are liable to rot due to a stuffy atmosphere. In addition, since transpiration becomes more active in an atmosphere at an increased temperature or a lower humidity, the packages products are further liable to rot in the resulting high temperature and high humidity atmosphere.

Then, in order to improve fresh keeping effect upon storage from the viewpoint of the above-described physiological activities, it has been attempted to improve gas permeability of a packaging bag having low gas permeability, for example, by providing perforation of an appropriate size to the bag or by cutting the bottom of the bag to prevent decrease in oxygen content and increase in carbon dioxide content as well as rise in temperature. However, such an attempt is a mere "first aid", and the distribution of temperature and the gas composition in a package are not always uniform. Therefore, rot progresses locally, particularly, at an inner portion which can not be observed from the outside. This may unexpectedly commit a fraud upon consumers. By the way, depending upon a particular kind of vegetables and fruits, perforation is not always preferred because a packaged product may be invaded with vermin and/or be wetted through perforation to deteriorate quality.

Under these circumstances, it has been requested to develop a packaging film which can maintain the inner temperature and the gas composition of a package suitable for physiological activities of particular vegetable and fruits to be packaged. However, such a packaging film, has not been proposed heretofore in the prior art. Further, packaging bags for vegetables and fruits produced by using presently available packaging films cause fogging due to condensation of moisture which is derived from the above-described transpiration or evaporation of free moisture on the inner surface of the bags to adversely affect appearance of packed products.

For, example, in the case of a polyethylene film, although it has a desired water vapour transmission, its oxygen and carbon dioxide permeabilities are insufficient and therefore vegetables and fruits are stifled to become less fresh within a short period of storage. In the case of a polystyrene film, although it has a desired oxygen and carbon dioxide permeabilities and can maintain respiration of vegetables and fruits for a long period of time, its water vapour transmission becomes too great, which results in activation of moisture transpiration to cause discoloration or wilting of vegetables and fruits within a short prior of time therefore it is difficult to keep them fresh for a long time.

In addition, the above-described known films are deficient in anti-fogging properties, which results in less commercial value due to bad appearance and, further, so-called wet rot caused by contact of vegetables and fruits with condensed water at a fogging part.

OBJECTS OF THE INVENTION

The present inventors have studied intensively to obtain a multilayered film which has sufficient water vapour transmission and oxygen and carbon dioxide permeabilities as well as sufficient anti-fogging properties for packaging vegetables and fruits or other purposes such as covering and dividor materials and the like. As the results, it has been found that a desired multilayered film can be obtained by defining water vapour transmission and oxygen and carbon dioxide permeabilities within specific ranges, respectively as well as by incorporating a suitable amount of an anti-fogging agent into a component material.

One object of the present invention is to provide a multilayered film which has sufficient water vapour transmission and oxygen and carbon dioxide permeabilities for packaging vegetables and fruits or other purposes such as covering and dividor materials of a greenhouse and the like.

Another object of the present invention is to provide a packaging bag produced from the multilayered film of the present invention suitable for vegetables and fruits which has sufficient anti-fogging properties for preventing fogging on its surface contacting with vegetables and fruits.

These objects as well as other objects and advantages of the present invention will become apparent to those skilled in the art from the following description with reference to the accompanying drawings.

SUMMARY OF THE INVENTION

Figure 1:
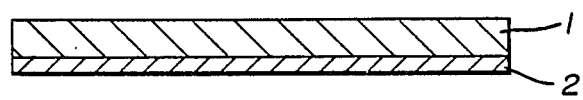
FIG. 1 is a cross section of one embodiment of the multilayered film of the present invention.

According to the present invention, there is provided (1) an anti-fogging multilayered film comprising a base layer and at least one surface layer containing an anti-fogging agent which may be incorporated into the surface layer and/or migrated from the other layer to the surface layer, said film having a water vapour transmission of 15 to 200 g/$m^2$·24 hr·40° C., an oxygen permeability of 3,000 to 35,000 cc/$m^2$·24 hr·atm·20° C.·90% RH, and a carbon dioxide permeability of 12,000 to 130,000 cc/$m^2$·24 hr·atm·20° C.·90% RH, and said anti-fogging surface layer having heat sealing properties.

(2) Preferably, the above surface layer of the anti-fogging multilayered film of the present invention has such heat sealing property that the film has a side welding seal strength of not less than 3.0 kg·cm/15 mm when side welding seal is carried out at 270° C.

(3) More preferably, at least one surface layer of the film shows anti-fogging property during the course of repetition of temperature rise and drop between 20° and 40° C.

(4) More preferably, at least one surface layer of the film shows anti-fogging property during the course of repetition of temperature rise and drop between 0° and 40° C.

(5) More preferably, the surface layer having heat sealing property of the above anti-fogging multilayered film is mainly composed of a polymer selected from the group consisting of a homopolymer or copolymer of α-olefin having a melting point of 80° to 150° C. and a mixture thereof.

(6) More preferably, the α-olefin of the polymer which constitutes the surface layer having heat sealing property of the film is one or more members selected from those having 2 to 10 carbon atoms.

(7) More preferably, the α-olefin copolymer which constitutes the surface layer having heat sealing property of the film is a random or block copolymer of one or more α-olefins having 2 to 10 carbon atoms.

(8) Further, preferably, the base layer of the anti-fogging multilayered film of the present invention is composed of a mixture of (a) 30 to 90% by weight of one or more copolymers of α-olefins having 2 to 10 carbon atoms, and (b) 10 to 70% by weight of one or more copolymers which contain one or more monomer units selected from the group consisting of vinyl acetate, acrylic acid and styrene in an amount of 5 to 80% by weight, and other copolymerizable monomer units in an amount of 95 to 20% by weight based on the total constituent components.

(9) The present invention provides a bag for packaging vegetables and fruits which comprises front and rear walls of the above anti-fogging multilayered film, and at least three peripheral sides of the front wall being connected to the corresponding peripheral sides of the rear wall in such a manner that the anti-fogging surface layer having heat sealing property of the front wall is faced to that of the rear wall to form a bag.

(10) Further, in one embodiment, the bag of the present invention has at least one perforation provided on a part of or the entire surface of the walls total aperture area of which is corresponding to 0.02 to 3.5% of total surface area of the bag. This bag is suitable for packaging vegetables and fruits which maintain vigorous physiological activities after harvesting.

(11) Furthermore, in another embodiment, the bag of the present invention has at least one cutout of 4 to 100 mm in length provided on its bottom side in such a manner that not less than 50% of the entire length of the bottom side remains as a sealed area.

DETAILED DESCRIPTION OF THE INVENTION

The multilayered film of the present invention is characterized by the specific water vapour transmission, the specific oxygen and carbon dioxide permeability, the surface layer containing an anti-fogging agent which is contacted with vegetables and fruits to be packaged when the film is used as a packaging bag, and heat sealing properties of the surface layer containing an anti-fogging agent.

That is, in the present invention, the film has water vapour transmission of 15 to 200 g/$m^2$·24 hr·40° C.

Water vapour transmission is an important property for properly maintaining humidity in the bag derived from moisture released by transpiration or evaporation of free moisture in vegetables and fruits, for preventing rot due to a stuffy atmosphere resulted by excess humidity, and for preventing wilting, discoloration (yellowing or browning), softening, loss of elasticity and the like due to insufficient humidity. When water vapour transmission is less than 15 g/$m^2$·24 hr·40° C., vegetables and fruits become liable to rot due to a stuffy atmosphere resulted by excess humidity. On the other hand, when water vapour transmission is more than 200 g/$m^2$·24 hr·40° C., vegetables and fruits become liable to cause wilting and discoloration due to insufficient humidity inside of the bag. Therefore, the water vapour transmission should be maintained in the above range, preferably, 20 to 150 g/$m^2$·24 hr·40° C. to obtain sufficient fresh keeping effect.

The film has oxygen permeability of 3,000 to 35,000 cc/$m^2$·24 hr·atm·20° C.·90% RH.

Oxygen permeability is a very important property for making up for decrease in oxygen content due to respiration with air permeated into the bag from the outside to maintain physiological activities. When oxygen permeability is less than 3,000 cc/$m^2$·24 hr·atm·20° C.·90% RH, particularly, in the case of packaging vegetables and fruits having active respiration (requiring a large amount of oxygen), sufficient fresh keeping effect can not be obtained because stifled state due to deficient in inner oxygen content. On the other hand, when oxygen permeability is more than 35,000 cc/m$^2$·24 hr·atm·20° C.·90% RH, microorganisms such as bacteria and fungi are liable to permeate into the bag to cause rot of vegetables and fruits, which results in rather lowering of fresh keeping effect. Therefore, the oxygen permeability should be maintained in the above range, preferably, 4,000 to 20,000 cc/m$^2$·24hr·atm·20° C.·90% RH.

The film has carbon dioxide permeability of 12,000 to 130,000 cc/m$^2$·24 hr·atm·20° C.·90% RH.

Carbon dioxide permeability is a very effective property for properly maintaining the gas composition in a packaging bag, for ensuring respiration, for avoiding carbon dioxide impediment and for preventing rot by growth of invaded microorganisms. When carbon dioxide permiability is less than 12,000 c/m$^2$·24 hr·atm·20° C.·90% RH, carbon dioxide concentration in a packaging bag becomes too high to maintain normal respiration of vegetables and fruits to quickly and adversely affect freshness and taste thereof. On the other hand, when carbon dioxide permiability is more than 130,000 cc/m$^2$·24 hr·atm·20° C.·90% RH, carbon dioxide concentration in a packaging bag becomes too low to effectively prevent rot and deterioration. Therefore, the carbon dioxide permeability should be maintained in the above range, preferably, 15,000 to 100,000 cc/m$^2$·24 hr·atm·20° C.·90% RH.

In the present invention, one of the above water vapour transmission, oxygen permeability and carbon dioxide permeabilities is outside of the above range, the desired result can not be obtained.

Further, the surface layer of the film of the present invention which contacts with vegetables and fruits to be packaged contains an anti-fogging agent which provides sufficient anti-fogging property during storage and marketing a packaged product, and has heat sealing property. Preferably, the heat sealing property is such that side welding seal strength is not less than 3.0 kg·cm/15 mm when side welding seal is carried out at 270° C. That is, in the present invention, anti-fogging property is very important from the viewpoint of not only for preventing fogging of the inner surface of a package to improve commercial value, but also for wet rot of contents due to water drops resulted from progress of fogging. Further, in order to maintain excellent anti-fogging property for a long time during marketing, it is desired that the surface layer contains such an anti-fogging agent that it can provide sufficient anti-fogging property during the course of repetition of temperature rise and drop between 20° and 40° C., preferably, between 0° and 40° C. from the viewpoint of temperature change during storage and marketing. As described above, the film of the present invention is used for packaging vegetables and fruits which maintain their vital physiological activities after harvesting. Since such products are desired to store a packaged product at room temperature rather than refrigeration, in the present invention, it is preferred to determine anti-fogging property based on anti-fogging property durability during the course of repetition of temperature rise and drop between 20° and 40° C. or between 0° and 40° C. Preferably, the film of the present invention has anti-fogging property of at least 1 day in the following evaluation.

Anti-Fogging Property Evaluation Method

Warm water at 40° C. (150 ml) is placed in a 200 ml beaker and the beaker is covered up with a sample of film so that the surface having anti-fogging properly of the film is faced to the inside of the beaker. The beaker is allowed to stand at 20° C. (or 0° C.) for 6 hours. This temperature change is repeated twice (total 24 hours) and whether the content of the beaker can be seen through the film or not is observed by the naked eye.

The anti-fogging agent to be contained in the surface layer is not limited to a specific one and any known anti-fogging agent including an agent which can provide anti-fogging property such as an antistatic agent, a lubricating agent, etc. can be used in the present invention. The anti-fogging agent can be used alone or in combination thereof. Examples of the anti-fogging agent include nonionic surfactants such as alkyldialcoholamide, polyalkylene glycol, polyoxyalkylene fatty acid ester, polyoxyalkylene higher alcohol ether, polyoxyalkylene alkylphenol ether, polyoxyalkylene alkylamino ether, partial fatty acid ester of polyhydric alcohol, polyalkylene glycol higher fatty acid ester, polyalkylene glycol higher alcohol ether and polyalkylene glycol alkylphenol ether; anionic surfactants such as metallic soap alkylnaphthalenesulfonate and higher alcohol sulfate; cationic surfactants such as alkylpyridinum halide and alkylpyridinum sulfate; derivatives thereof and a mixture thereof. The anti-fogging can be directly incorporated into a constituent material of the surface layer. Further, it is possible to incorporate the anti-fogging agent into only a constituent material of the base layer of the film so that the agent migrates to and diffuses in the surface layer after laminating the layers to provide anti-fogging property to the surface layer. The amount of the anti-fogging agent to be contained in the surface layer is varied depending upon the variety of the anti-fogging agent and therefore can not be limited to a specific range. However, preferably, the amount of the anti-fogging agent contained in the surface layer is 0.3 to 3% by weight. When the amount is less than 0.3% by weight, it is difficult to obtain the desired anti-fogging property. On the other hand, when the amount is more than 3% by weight, whitening is caused in the surface layer to decrease in transparency and further clouding is caused by collection of water on the inner surface of a packaging bag due to transpiration of vegetables and fruits to remarkably lower commercial value.

By the way, as an alternative simple evaluation method of anti-fogging property of the film before it is formed in a bag, measurement of a surface tension of the surface layer is employed. According to the present inventors' confirmation, it has been found that the desired anti-fogging property durability can be obtain by adjusting the amount of the anti-fogging agent contained in the surface layer so that the layer has a surface tension of at least 38 dyne/cm.

The multilayered film of the present invention is subjected to heat seal, such as side welding seal, heat plate seal, impulse heat seal or the like when seal is needed, for example, in production of packaging backs therefrom or after packaging vegetables and fruits. In this regard, in order to prevent peeling of a sealed part during packaging or marketing, it is preferred that the surface layer has a side welding seal strength of not less than 3.0 Kg·cm/15mm when side welding seal is carried out at 270° C.

The multilayered film of the present invention which has the above-described properties can be produced by coextrusion or in-line laminate process of synthetic resins each of which has respective properties desired for the corresponding layer.

That is, the base layer should have at least a minimum mechanical properties required for the film and meet the required water vapour transmission and oxygen and carbon dioxide permeabilities. In view of this, a constitute material of the base layer is preferably a mixture of (a) one or more copolymers of α-olefin having 2 to 10 carbon atoms and (b) one or more copolymers which contain one or more monomer units selected from the group consisting of vinyl acetate, acrylic acid and styrene in an amount of 5 to 80% by weight, and other copolymerizable monomer units in an amount of 95 to 20% by weight based on the total constituent components. Preferably, the mixture contains 30 to 90% by weight of the component (a) and 10 to 70% by weight of the component (b). Examples of α-olefin having 2 to 10 carbon atoms of the component (a) include ethylene, propylene, butene, hexene, heptene and the like, preferably, ethylene, propylene and butene. When a random or block copolymer of two or more the above α-olefins is used, the film having all required permeabilities can be more readily obtained. In this case, the ratio of copolymerization can be appropriately determined by those skilled in the art based on the variety of α-olefins to be copolymerized. As the copolymer of the above component (b), it is preferred to use that containing one or more monomer units selected from the group consisting of vinyl acetate, acrylic acid and styrene in an amount of 5 to 80% by weight, and other copolymerizable monomer units in an amount of 95 to 20% by weight based on the total constituent components. The copolymerizable monomer is not limited to a specific one and examples thereof include α-olefins such as ethylene and propylene, acrylates such as acrylic acid esters and methacrylic acid esters, butadiene and the like. When the amount of the monomer units selected from the group consisting of vinyl acetate, acrylic acid and styrene is less than 5% by weight or more than 80% by weight, it is difficult to satisfy all the above permeabilities. In addition, when the amount is more than 80% by weight, haze of the film is liable to be deteriorated and liable to cause defects such as lowering of side welding sealing property or whisker at a sealed part.

By adjusting the proportion of the components (a) and (b) in the mixture so that the mixture contains 30 to 90% by weight of the component (a) and 10 to 70% by weight of the component (b) as described above, the film having balanced properties in respect of mechanical properties such as strength, transparencey and side welding sealing property as well as the above-described water vapour transmission and permeabilities can be obtained. When the amount of the component (a) is less than 30%, decrease in transparency may be caused. On the other hand, when the amount of the component (a) is more than 90% by weight, it may be difficult to adjust gas permeabilities of the film to the desired ranges of the present invention. For example, even if the film has desired oxygen and carbon dioxide permeabilities, water vapour transmission may be outside of the desired range and it is difficult to obtain an atmosphere suitable for packaging vegetables and fruits.

When components (a) and (b) are formulated in a composition, it is preferable to choose such conditions that the resulting composition has a melt index at 230° C. of 1 to 100 g/10 min., preferably, 2 to 50 g/min.

The surface layer of the multilayered film of the present invention should have excellent side welding sealing properties in addition to excellent long-term anti-fogging property. In order to meet these requirements, it is preferred to use a random or block copolymer of two or more of α-olefin monomers having 2 to 10 carbon atoms such as ethylene, propylene, butene, pentene, hexene, octene, decene and the like. The copolymer can be used alone or in combination thereof. Preferably, the surface layer having heat sealing property is mainly composed of a homopolymer or copolymer of α-olefin having a melting point of 80 to 155° C. or a mixture of two or more thereof. As described above, an anti-fogging agent can be directly incorporated into the surface layer, or the agent can be added to the base layer so that it can migrate and diffuse in the surface layer after lamination of the layers. In the case that the anti-fogging agent is added to the base layer, the agent is added in an amount of 0.3 to 3% by weight, preferably, 0.4 to 2.2% by weight. When the amount is less that 0.3% by weight, the amount of the anti-fogging agent contained in the surface layer becomes too small to provide sufficient anti-fogging property to the surface layer. On the other hand, when the amount of the anti-fogging agent is more than 3% by weight, whitening is caused as described above. By adding the anti- fogging agent to the base layer in the above amount, the surface layer can maintain sufficient anti-fogging property for a long time because the agent gradually migrates to the surface layer and diffuses through out the surface layer.

Thus, the amount of anti-fogging agent is preferably 0.3 to 3% by weight based on the total weight of the multilayered film.

As mentioned above, the multilayered film of the Present invention can be produced from the above constitute materials for the base layer and the surface layer by a conventional method such as coextrusion or in-line laminate process. Further, the number of the layers of the film is not limited. However, usually, 2 or 3 layers are preferred. Furthermore, although there is no limitation of thickness of each layer, it is preferred that the base layer is 4 to 200 μm in thickness and the surface layer is 0.3 to 8 μm in thickness. The ratio of the thickness of the base layer: the thickness of the surface layer (total thickness of the surface layers in the case that they are provided on both surfaces of the base layer) is preferably 99.5 to 60:0.5 to 40.

Figure 2:
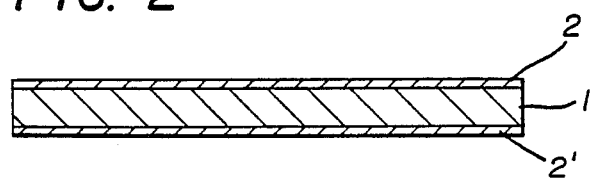
FIG. 2 is a cross section of another embodiment of the multilayered film of the present invention.

As shown in FIG. 1, one basic structure of the multilayered film of the present invention consists of a base layer 1 and a surface layer 2 provided on one surface of the base layer 1. FIG. 2 shows another basic structure of the multilayered film of the present invention consists of a base layer 1 and two surface layers 2 and 2' provided on both surfaces of the base layer 2. In the latter case, either or both surface layers may have anti-fogging property and heat sealing property.

In the film of the present invention, either surface thereof can be further processed such as printing, and the like. Such a film is also included in the present invention.

Further, each layer of the film of the present invention can contain additives such as lubricants, anti-blocking agents, antioxidants, ultraviolet absorbers, colorants, antistatics and the like as needed. Optionally, the multilayered film of the present invention can be subjected to uniaxial or biaxial orientation to further improve its properties.

The film of the present invention thus obtained is formed into a bag and, after packaging vegetables and fruits therein, it is usually marketed with or without sealing. Or, in some cases, vegetables and fruits can be wrapped with the film and the like. Further, where more high gas permeability is required, it is possible to provide perforation to the film of the bag produced therefrom or cutting off a part after formation of the bag.

In the case of producing a bag from the anti-fogging multilayered film of the present invention, sometimes, it is desirable to provide perforation having suitable size of a cutout on all or a part of the surface of the bag so that gas composition change in the package bag is immediately balanced by accelerating ventilation through the perforation or the cutout. As described above, when vegetables and fruits maintain vigorous physiological activities, sometimes, gas permeabilities of the film itself may become insufficient for maintaining the constant gas composition in the bag. In this case, the perforation accelerates ventilation to maintain the constant gas composition to keep suitable physiological circumstances for vegetables and fruits in the bag. Further, the perforation prevents condensation of moisture due to steep temperature change. Furthermore, even if condensation of moisture is caused, perforation releases condensed water outside the bag to prevent wet rot of vegetables and fruits.

In order to function these effects, perforation provided on a part of or the entire surface of the films in such a manner that total aperture area of which is corresponding to 0.02 to 3.5% of total surface area of the film. When the total aperture area is less than 0.02% of total surface area of the film, ventilation becomes insufficient and gas composition change in the bag can not be prevented. Further, it is difficult to prevent condensation of water due to steep temperature change. On the other hand, when perforation has too large size, moisture tranpiration becomes much remarkable to cause wilting or yellowing, particularly, in the case that outside humidity is very low. Further, microorganisms readily invade into the bag. Furthermore, decrease in mechanical strength of the film is resulted to cause breakage of the bags during packaging or transportation. Thus, the total aperture area should be less than 3.5% of total surface area of the film. The perforation can be provided either or both front and rear walls of the bag.

By adjusting the size and/or number of perforation, humidity and gas composition in the bag can be maintained in a suitable range without deficient in functions as a packaging bag to improve storage stability of vegetables and fruits, even when sweating is caused by vigorous physiological activities of vegetables and fruits and steep outer temperature change.

The cutout can be provided to the bottom side of the bag. The cutout can remove water condensed in the bag to prevent wet rot and can accelerate ventilation to maintain a suitable physiological circumstances for vegetables and fruits as described above. It is desirable to provide one to several (preferably, 6) cutouts of 4 to 100 mm in length. When the length is less than 4 mm, removal of condensed water and ventilation are insufficient. Therefore, it is difficult to prevent wet rot and to obtain sufficient fresh keeping effect for vegetables and fruits respiration of which are particularly active. On the other hand, when the length is more than 100 mm, moisture tranpiration becomes much remarkable to cause wilting or yellowing in the case that, for example, outside air is dry. Further, microorganisms readily invade into the bag. Furthermore, decrease in mechanical strength of the film is resulted to cause breakage of the bags during packaging or transportation. By the way, the size and number of the cutout is limited in view of mechanical strength of the bag because the cutout is provided to the bottom side of the bag. Since mechanical strength of the bottom side is lowered by the cutout part, it should be provided in such a manner that not less than 50% of the entire length of the bottom side remains as a sealed area. When the bottom side is formed by a folding edge, the cutout can be provided in such a manner that not less than 40% of the entire length of the bottom side remains because the mechanical strength thereof is higher.

By adjusting the size and/or number of cutout, condensed water can be rapidly removed from the bag without deficient in functions as a packaging bag to improve storage stability of vegetables and fruits, even when sweating is caused by vigorous physiological activities of vegetables and fruits and steep outer temperature change.

The following examples further illustrate the present invention in detail but are not to be construed to limit the scope thereof. In the examples, all "%'s" are by weight unless otherwise stated.

Evaluation of water vapour transmission and oxygen and carbon dioxide permeabilities were carried out as follows provided that the value was not converted to standard conditions but was calculated as a volume at 20° C. from permeability per 24 hours.

Water Vapour Transmission

Water vapour transmission was evaluated according to JIS-Z-0208 B for vapour transmission test of a moistureproof packaging.

Oxygen Permeability and Carbon Dioxide Permeability

These permeabilities were evaluated according to JIS-Z-1707 for gas permeability test of plastic film for food.

Side welding seal strength was determined as follows.

A heated blade (270° C.) of 50 cm in width which had an edge angle of 70° was moved up and down at a rate of 50 times/min. to effect side welding seal of two sheets of laminated film. Sealing strength of the sealed part was determined by using Tensilon according to the following procedure.

A sealed film was cut into 15 mm in width to obtain a sample having a sealed part therein. The sample was set between the chucks of a tensile tester (Tensilon) adjusted to the sample length between the chucks of 20 mm so that the sealed part was placed in the center of the sample (i.e., the distance between the sealed part and the chuck being 10 mm). Then, the chucks were moved at a rate of deformation of 200 mm/min. to calculate an area based on the distance and the strength of elongation until the sample was broken, which was expressed as an energy (kg·cm/15 mm).

EXAMPLE 1

A multilayered film consisting of a base layer and two surface layered provided on both surfaces of the base layer was prepared by coextrusion (extrusion temperature: 260° C., cooling: 20° C.) of a constituent material for the base layer which was a mixture of 65% of ethylene/prolylene copolymer (ethylene content: 5%) and 35% of ethylene/vinyl acetate copolymer (vinyl acetate content: 28%), and a constituent material for the surface layer which was a mixture (1:1 by weight) of propylene/butene-1 copolymer (butene-1 content: 18%) and butene/ethylene copolymer (ethylene content: 3.5%). In the constituent material for the surface layer, 0.6% of a higher fatty acid ester of monoglyceride was included as an anti-fogging agent. Subsequently, the resulting film was subjected to biaxial orientation at a lengthwise draw ratio of 3 and a lateral draw ratio of 8 and then subjected to corona discharge to obtain a three layered film of 20 μm in total thickness, i.e., the base layer: 16 μm and the surface layers: 2 μm×2. The surface tension of one surface (A) of the resulting desired multilayered film was 42 dyne/cm and the other surface (B) was 38 dyne/cm. Its properties are shown in Table 1.

TABLE 1

| | | |
|---|---|---|
| Water vapour transmission ($g/m^2 \cdot 24$ hr $\cdot 40°$ C.) | | 25 |
| Oxygen permeability ($cc/m^2 \cdot 24$ hr $\cdot$ atm $\cdot 20°$ C. $\cdot 90\%$ RH) | | 4,200 |
| Carbon dioxide permeability ($cc/m^2 \cdot 24$ hr $\cdot$ atm $\cdot 20°$ C. $\cdot 90\%$ RH) | | 18,000 |
| Anti-fogging property* | (A) | no fogging |
| | (B) | no fogging |
| Side welding seal strength** (kg $\cdot$ cm/15 mm) | (A) | 5.8 |
| | (B) | 6.3 |

*The film was formed in a bag and "Shiitake" mushroom was enclosed in the bag. Temperature rise and drop between 20 and 40° C. was repeated (twice per day). The result was observed after 1 day.
**The strength was determined by carrying out side welding seal at sealing rate of 60 times/min. at 270° C.

EXAMPLE 1-1

A bag was prepared from the above-obtained film in such a manner that the surface (A) was faced to the inside of the bag. Eggplant immediately after harvesting was enclosed in the bag and freshness change at storage was evaluated. Respiration capacity of the eggplant was 20 $CO_2$ mg/kg·hr at 15° C. and 110 $CO_2$ mg/kg·hr at 25° C.

EXAMPLES 1-2 to 1-4

Figure 3:
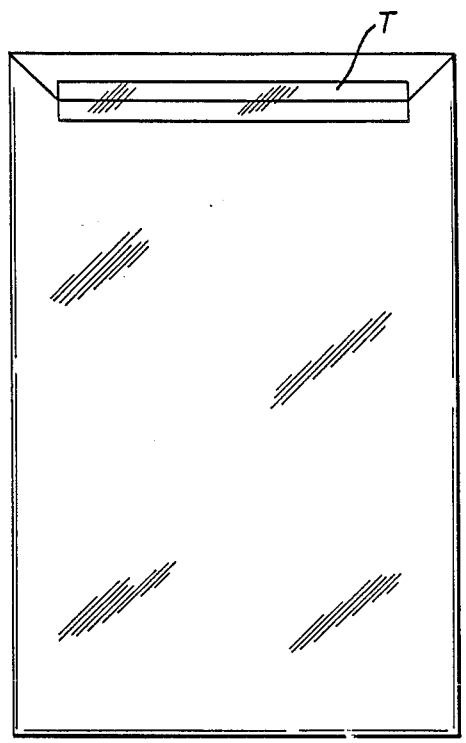
FIGS. 3 to 6 are front views of preferred embodiments of the packaging bags of the present invention.

A bag (length 280 mm ×width 180 mm) was prepared from the above-obtained film in such a manner that the surface (A) was faced to the inside of the bag and two opposite peripheral parts were sealed by side welding seal. As shown in FIG. 3, 10 circular perforations of 2 mm in diameter were provided to each surface (total aperture area of which was corresponding to 0.06% of total surface area of the bag). Eggplant immediately after harvesting was enclosed in the bag, the upper opening of the bag was closed with a tape (T), and freshness change at storage was evaluated (Example 1-2). The same procedure as in Example 1-2 was repeated by using a bag having 2 circular perforations of 2 mm in diameter the total aperture area of which was corresponding to 0.012% of total surface area of the bag (Example 1-3) and a bag having 20 circular perforations of 12 mm in diameter the total aperture area of which was corresponding to 4.49% (Example 1-4).

EXAMPLES 1-5 to 1-7

Figure 5:
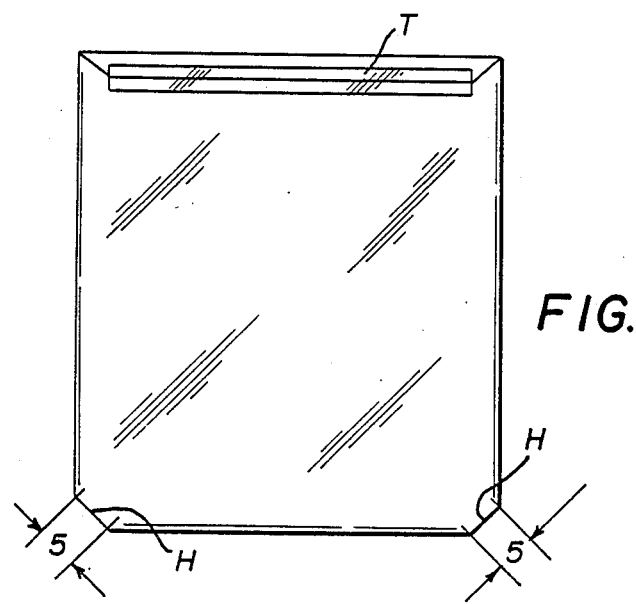

A bag (length 280 mm × width 180 mm) was prepared from the above-obtained film in such a manner that the surface (A) was faced to the inside of the bag and two opposite peripheral parts were sealed by side welding seal. As shown in FIG. 5, two corners of the bottom side of the bag were cut out in a shape of an isosceles triangle having 5 mm in length to form two cutouts (H) (peripheral length: 5 mm×2 = 10 mm, remaining length of bottom side as sealed area: 96.1%) Eggplant immediately after harvesting was enclosed in the bag, the upper opening of the bag was closed with tape (T), and freshness change at storage was evaluated (Example 1-5). The same procedure as in Example 1-5 was repeated by using a bag having two cutout parts at the bottom side (peripheral length: 2 mm×2, remaining length of the bottom side as sealed area: 98.4%) (Examples 1-6) and a bag having two cutout parts at the bottom side (peripheral length: 80 mm×2, remaining length of bottom side as sealed area: 37.1%) Example 1-7).

In these evaluations, fresh keeping effect is evaluated based on the criteria as shown in Table 2.

TABLE 2

| | |
|---|---|
| Discoloration | |
| Score 5: | no change |
| Score 4: | slight discoloration but not noticeable |
| Score 3: | apparent discoloration and problem in practice |
| Score 2: | remarkable discoloration in root, stem and pulp parts and not practicable |
| Score 1: | remarkable discoloration and not practicable |
| Softening | |
| Score 5: | no change |
| Score 4: | slight change of hardness but sufficient elasticity maintained |
| Score 3: | recess formed without restoration when push with finger, and problem in practice |
| Score 2: | softening pulp progressed, recess remained when push with finger, |
| Score 1: | softening, wilting and not practicable |
| Looseness | |
| Score 5: | no looseness |
| Score 4: | no problem |
| Score 3: | looseness found in surface, root and stem parts and problem in practice |
| Score 2: | remarkable looseness found entire parts, sticky material formed on surface, not practicable |
| Score 1: | rotten, not practicable |
| Odor | |
| Score 5: | flesh flavor |
| Score 4: | decrease in initial flesh flavor, slight change of odor |
| Score 3: | odor clearly produced, problem in practice |
| Score 2: | remarkable odor, unpleasant, not practicable |
| Score 1: | extremely remarkable odor, not practicable |

The results of the evaluation are shown in Tables 3A and 3B. For comparison, the evaluations of eggplant without packaging, packaged with OPP film (biaxially oriented polypropylene film 20 μm in thickness) and packaged with PE (polyethylene film, 30 μm thickness) are also shown in Table 3B.

TABLE 3A

Vegetable: eggplant
Storage conditions: 35° C. × 70% RH
Size of bag and content: 180 mm × 280 mm, sealed package, 2 pieces

| Fresh keeping evaluation | Score | | | | | |
|---|---|---|---|---|---|---|
| | Ex. 1-1 | Ex. 1-2 | Ex. 1-3 | Ex. 1-4 | Ex. 1-5 | Ex. 1-6 |
| 1 day | | | | | | |
| Discoloration | 5 | 5 | 5 | 5 | 5 | 5 |
| Softening | 5 | 5 | 5 | 4 | 5 | 5 |
| Looseness | 5 | 5 | 5 | 5 | 5 | 5 |

TABLE 3A-continued

Vegetable: eggplant
Storage conditions: 35° C. × 70% RH
Size of bag and content: 180 mm × 280 mm, sealed package, 2 pieces

| Fresh keeping evaluation | Ex. 1-1 | Ex. 1-2 | Ex. 1-3 | Ex. 1-4 | Ex. 1-5 | Ex. 1-6 |
|---|---|---|---|---|---|---|
| Odor | 5 | 5 | 5 | 5 | 5 | 5 |
| 2 days | | | | | | |
| Discoloration | 5 | 5 | 5 | 4 | 5 | 5 |
| Softening | 5 | 5 | 5 | 3 | 5 | 5 |
| Looseness | 5 | 5 | 5 | 5 | 5 | 5 |
| Odor | 5 | 5 | 5 | 5 | 5 | 5 |
| 4 days | | | | | | |
| Discoloration | 5 | 5 | 5 | 3 | 5 | 5 |
| Softening | 5 | 5 | 5 | 2 | 5 | 5 |
| Looseness | 5 | 5 | 5 | 5 | 5 | 5 |
| Odor | 4 | 5 | 5 | 5 | 5 | 5 |
| 6 days | | | | | | |
| Discoloration | 3 | 4 | 3 | 1 | 4 | 3 |
| Softening | 4 | 4 | 4 | 1 | 4 | 4 |
| Looseness | 3 | 5 | 4 | 5 | 4 | 4 |
| Odor | 3 | 4 | 3 | 5 | 4 | 3 |

TABLE 3B

Vegetable: eggplant
Storage conditions: 35° C. × 70% RH
Size of bag and content: 180 mm × 280 mm, sealed package, 2 pieces

| Fresh keeping evaluation | Ex. 1-7 | No package | OPP film | PE film |
|---|---|---|---|---|
| 1 day | | | | |
| Discoloration | 5 | 5 | 5 | 5 |
| Softening | 5 | 3 | 5 | 5 |
| Looseness | 5 | 5 | 3 | 5 |
| Odor | 5 | 5 | 3 | 5 |
| 2 days | | | | |
| Discoloration | 4 | 3 | 3 | 3 |
| Softening | 3 | 1 | 5 | 3 |
| Looseness | 5 | 5 | 2 | 5 |
| Odor | 5 | 5 | 2 | 4 |
| 4 days | | | | |
| Discoloration | 2 | 2 | 2 | 2 |
| Softening | 2 | 1 | 5 | 3 |
| Looseness | 5 | 5 | 1 | 3 |
| Odor | 5 | 5 | 1 | 2 |
| 6 days | | | | |
| Discoloration | 2 | 1 | 1 | 1 |
| Softening | 2 | 1 | 4 | 2 |
| Looseness | 5 | 5 | 1 | 2 |
| Odor | 4 | 5 | 1 | 1 |

EXAMPLE 2

According to the same manner as in Example 1, a multilayered film consisting of a base layer and two surface layered provided on both surfaces of the base layer was prepared by coextrusion (extrusion temperature: 250°C., cooling: 25° C.) of a constituent material for the base layer which was a mixture of 90% of propylene/butene-1 copolymer (butene-1 content: 20%) and 10% of ethylene/styrene copolymer (styrene content: 40%), and a constituent material for the surface layer which was a mixture of 70% of propylene/butene-1 copolymer (butene-1 content: 18%) and 30%). In the constituent material for the base layer, 6% of a higher fatty acid ester of monoglyceride was added as an anti-fogging agent. Subsequently, the resulting film was subjected to biaxial orientation at a lengthwise draw ratio of 2.5 and a lateral draw ratio of 7.8 to obtain a three layered film of 23 $\mu$m in total thickness, i.e., the base layer: 20 $\mu$m and the surface layers: 1.5 $\mu$m × 2. The surface tension of one surface (A) of the resulting desired multilayered film was 41 dyne/cm and the other surface (B) was 38 dyne/cm. Both surface layers showed excellent anti-fogging property due to anti-fogging agent migrated from the base layer. Its properties are shown in Table 4.

TABLE 4

| | | |
|---|---|---|
| Water vapour transmission ($g/m^2 \cdot 24$ hr $\cdot 40°$ C.) | | 30 |
| Oxygen permeability ($cc/m^2 \cdot 24$ hr $\cdot$ atm $\cdot 20°$ C. $\cdot$ 90% RH) | | 6,000 |
| Carbon dioxide permeability ($cc/m^2 \cdot 24$ hr $\cdot$ atm $\cdot 20°$ C. $\cdot$ 90% RH) | | 27,000 |
| Anti-fogging property* | (A) | no fogging |
| | (B) | no fogging |
| Side welding seal strength** (kg $\cdot$ cm/15 mm) | (A) | 3.3 |
| | (B) | 3.6 |

*The film was formed in a bag and "Shiitake" mushroom was enclosed in the bag. Temperature rise and drop between 20 and 40° C. was repeated (twice per day). The result was observed after 1 day.
**The strength was determined by carrying out side welding seal at sealing rate by pressing at 140° C., pressure of 1 kg/cm² for 1 sec.

EXAMPLE 2-1

A bag (length 320 mm × width 150 mm) was prepared from the above-obtained film in such a manner that the surface (A) was faced to the inside of the bag and two opposite peripheral parts were sealed with side welding seal. Cucumber immediately after harvesting was enclosed in the bag and freshness change at storage was evaluated. Respiration capacity of the cucumber was 20 $CO_2$ mg/kg·hr at 15° C. and 130 $CO_2$ mg/kg·hr at 25° C.

EXAMPLES 2-2 to 2-4

Figure 4:
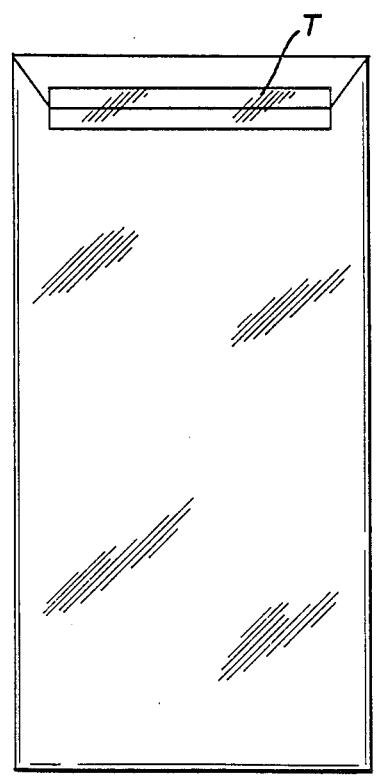

As shown in FIG. 4, 2 circular perforations of 3 mm in diameter at the upper part of the bag and 3 circular perforations of 4 mm in diameter at the lower part of the bag were provided to each surface (total aperture area of which was corresponding to 0.018% of total surface area of the bag). Cucumber immediately after harvesting was enclosed in the bag, the upper opening of the bag was closed with a tape (T), and freshness change at storage was evaluated (Example 2-2). The same procedure as in Example 2-2 was repeated by using a bag having 2 circular perforations of 2 mm in diameter the total aperture area of which is corresponding to 0.013% of total surface area of the bag (Example 2-3) and a bag having 10 circular perforations of 16 mm in diameter the total aperture area of which is corresponding to 4.18% (Example 2-4).

EXAMPLES 2-5 to 2-7

Figure 6:
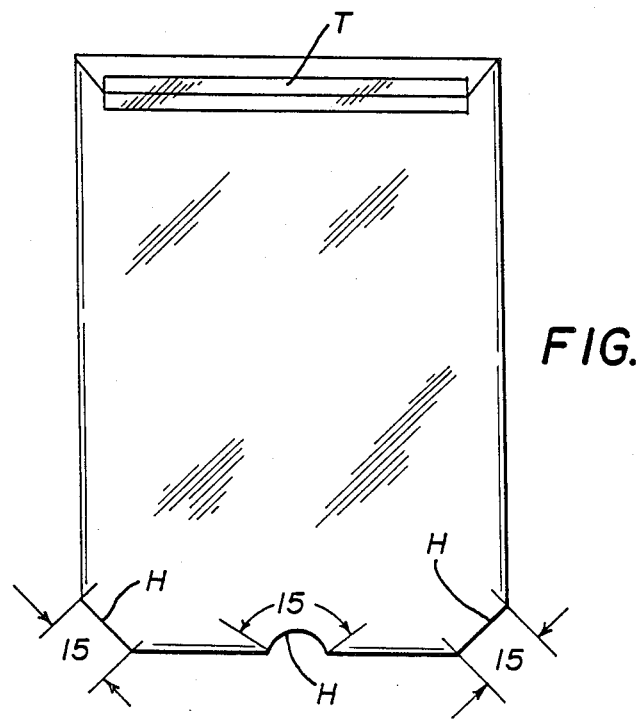

As shown in FIG. 6, two corners and the central part of the bottom side of the bag each having 15 mm in length were cut out to form three cutouts (H) (each peripheral length: 15 mm × 2 = 30 mm, remaining length of bottom side as sealed area: 79.5%) Cucumber immediately after harvesting was enclosed in the bag, the upper opening of the bag was closed with a tape (T), and freshness change at storage was evaluated (Example 2-5). The same procedure as in Example 2-5 was repeated by using a bag having two cutout parts at two corner of the bottom side (peripheral length: 1.5 mm×2, remaining length of the bottom side as sealed area: 98.6%) (Examples 2-6) and a bag having three cutout parts at two corner and the central part of the bottom side (peripheral length: 45 mm×2 and 30 mm×1, remaining length of bottom side as sealed area: 45%) (Example 2-7).

The results are shown in Tables 5A and 5B. For comparison, evaluations for cucumbers without packaging, packaged with OPP film (biaxially oriented polypropylene film, 20 μm in thickness), and packaged with PE film (polyethylene film, 30 μm in thickness) are also shown in Table 5B.

TABLE 5A

Vegetable: cucumber
Storage conditions: 35° C. × 70% RH
Size of bag and content: 150 mm × 320 mm, sealed package, 2 pieces

| Fresh keeping evaluation | Ex. 2-1 | Ex. 2-2 | Ex. 2-3 | Ex. 2-4 | Ex. 2-5 | Ex. 2-6 |
|---|---|---|---|---|---|---|
| 1 day | | | | | | |
| Discoloration | 5 | 5 | 5 | 5 | 5 | 5 |
| Softening | 5 | 5 | 5 | 5 | 5 | 5 |
| Looseness | 5 | 5 | 5 | 5 | 5 | 5 |
| Odor | 5 | 5 | 5 | 5 | 5 | 5 |
| 3 days | | | | | | |
| Discoloration | 5 | 5 | 5 | 4 | 5 | 5 |
| Softening | 5 | 5 | 5 | 4 | 5 | 5 |
| Looseness | 5 | 5 | 5 | 5 | 5 | 5 |
| Odor | 5 | 5 | 5 | 5 | 5 | 5 |
| 5 days | | | | | | |
| Discoloration | 5 | 5 | 5 | 2 | 5 | 5 |
| Softening | 5 | 5 | 5 | 3 | 5 | 5 |
| Looseness | 5 | 5 | 5 | 5 | 5 | 5 |
| Odor | 4 | 5 | 5 | 5 | 5 | 4 |
| 6 days | | | | | | |
| Discoloration | 4 | 4 | 4 | 1 | 4 | 4 |
| Softening | 5 | 4 | 5 | 2 | 5 | 5 |
| Looseness | 4 | 5 | 4 | 5 | 4 | 4 |
| Odor | 3 | 5 | 4 | 5 | 5 | 4 |

TABLE 5B

Vegetable: cucumber
Storage conditions: 35° C. × 70% RH
Size of bag and content: 150 mm × 320 mm, sealed package, 2 pieces

| Fresh keeping evaluation | Ex. 2-7 | No package | OPP film | PE film |
|---|---|---|---|---|
| 1 day | | | | |
| Discoloration | 5 | 5 | 5 | 5 |
| Softening | 5 | 3 | 5 | 5 |
| Looseness | 5 | 5 | 4 | 5 |
| Odor | 5 | 5 | 5 | 5 |
| 3 days | | | | |
| Discoloration | 4 | 3 | 5 | 5 |
| Softening | 3 | 2 | 5 | 4 |
| Looseness | 5 | 5 | 2 | 4 |
| Odor | 5 | 5 | 2 | 4 |
| 5 days | | | | |
| Discoloration | 3 | 1 | 5 | 3 |
| Softening | 2 | 1 | 5 | 4 |
| Looseness | 5 | 5 | 1 | 3 |
| Odor | 5 | 5 | 1 | 3 |
| 6 days | | | | |

TABLE 5B-continued

Vegetable: cucumber
Storage conditions: 35° C. × 70% RH
Size of bag and content: 150 mm × 320 mm, sealed package, 2 pieces

| Fresh keeping evaluation | Ex. 2-7 | No package | OPP film | PE film |
|---|---|---|---|---|
| Discoloration | 2 | 1 | 3 | 2 |
| Softening | 1 | 1 | 5 | 3 |
| Looseness | 5 | 5 | 1 | 2 |
| Odor | 5 | 5 | 1 | 1 |

EXAMPLE 3

According to the same procedure as described in Example 1, fresh keeping effect of the bags of Examples 1-1 to 1-7 was evaluated by using green soybean (Examples 3-1 to 3-7). Respiration capacity of green soybean was 170 $CO_2$ mg/kg·hr at 15° C. and 380 $CO_2$ mg/kg·hr at 25° C.

The results are shown in Tables 6A and 6B.

TABLE 6A

Vegetable: green soybean
Storage conditions: 23° C. × 65% RH
Size of bag and content: 180 mm × 280 mm, sealed package, 300 g pack

| Fresh keeping evaluation | Ex. 3-1 | Ex. 3-2 | Ex. 3-3 | Ex. 3-4 |
|---|---|---|---|---|
| 2 day | | | | |
| Discoloration | 5 | 5 | 5 | 4 |
| Softening | 5 | 5 | 5 | 4 |
| Looseness | 5 | 5 | 5 | 5 |
| Odor | 5 | 5 | 5 | 5 |
| 4 days | | | | |
| Discoloration | 5 | 5 | 5 | 3 |
| Softening | 5 | 5 | 5 | 3 |
| Looseness | 5 | 5 | 5 | 5 |
| Odor | 5 | 5 | 5 | 5 |
| 6 days | | | | |
| Discoloration | 5 | 5 | 5 | 2 |
| Softening | 5 | 5 | 5 | 3 |
| Looseness | 5 | 5 | 5 | 5 |
| Odor | 4 | 5 | 4 | 5 |
| 8 days | | | | |
| Discoloration | 3 | 3 | 3 | 1 |
| Softening | 4 | 4 | 4 | 2 |
| Looseness | 3 | 4 | 3 | 5 |
| Odor | 3 | 5 | 3 | 5 |

TABLE 6B

Vegetable: green soybean
Storage conditions: 23° C. × 65% RH
Size of bag and content: 180 mm × 280 mm, sealed package, 300 g pack

| Fresh keeping evaluation | Ex. 3-5 | Ex. 3-6 | Ex. 3-7 |
|---|---|---|---|
| 2 day | | | |
| Discoloration | 5 | 5 | 5 |
| Softening | 5 | 5 | 5 |
| Looseness | 5 | 5 | 5 |
| Odor | 5 | 5 | 5 |
| 4 days | | | |
| Discoloration | 5 | 5 | 4 |

TABLE 6B-continued

Vegetable: green soybean
Storage conditions: 23° C. × 65% RH
Size of bag and content: 180 mm × 280 mm, sealed package, 300 g pack

| Fresh keeping evaluation | Score Ex. 3-5 | Ex. 3-6 | Ex. 3-7 |
|---|---|---|---|
| ation | | | |
| Softening | 5 | 5 | 3 |
| Looseness | 5 | 5 | 5 |
| Odor | 5 | 5 | 5 |
| 6 days | | | |
| Discoloration | 5 | 5 | 3 |
| Softening | 5 | 5 | 2 |
| Looseness | 5 | 5 | 5 |
| Odor | 5 | 4 | 5 |
| 8 days | | | |
| Discoloration | 3 | 3 | 1 |
| Softening | 4 | 4 | 2 |
| Looseness | 4 | 3 | 4 |
| Odor | 4 | 3 | 4 |

EXAMPLE 4

A multilayered film consisting of a base layer and two surface layered provided on both surfaces of the base layer was prepared by coextrusion of a constituent material for the base layer as shown in Table 7 and a constituent material for the surface layer which was propylene/butene-1 copolymer (butene-1 content: 18%). In the constituent material for the surface layer, 1% of a higher fatty acid ester of monoglyceride was included as an anti-fogging agent. Subsequently, the resulting film was subjected to biaxial orientation at a lengthwise draw ratio of 2.5 and a lateral draw ratio of 7.9 and then subjected to corona discharge so that the surface layer thereof had surface tension of 39 dyne/cm. The properties of the resulting films are shown in Table 8.

TABLE 7

| Film | Constituent material for base layer | Thickness (μm) Base layer | Surface layer (× 2) |
|---|---|---|---|
| A | Polypropylene 100% | 10 | 1 |
| B | Propylene/butene-1 (butene-1: 20%) 50%, Ethylene/vinyl acetate (vinyl acetate: 28%) 50% | 12 | 4 |
| C | Ethylene/vinyl acetate (vinyl acetate: 28%) 100% | 19.4 | 0.3 |
| D | Propylene/butene-1 (butene-1: 20%) 30%, Ethylene/vinyl acetate (vinyl acetate: 28%) 70% | 13.2 | 0.4 |
| E | EVO-OH (ethylene: 32%, saponification value: 99 mol %) 50%, ethylene/vinyl acetate (vinyl acetate: 28%) 50% | 12 | 1 |
| F | Propylene/butene-1 (butene-1: 20%) 30%, ethylene/vinyl acetate (vinyl acetate: 28%) 70% | 26 | 2 |
| G | Ethylene/vinyl acetate (vinyl acetate: 28%) 100% | 10 | 0.2 |
| H | Propylene/butene-1 (butene-1: 20%) 30% ethylene/styrene (styrene: 40%) 70% | 10 | 0.7 |

TABLE 8

| | A | B | C | D |
|---|---|---|---|---|
| Water vapour transmission (g/m² · 24 hr · 40° C.) | 10 | 18 | 220 | 190 |
| Oxygen permeability (cc/m² · 24 hr · atm · 20° C. · 90% RH) | 5,200 | 4,200 | 9,400 | 8,200 |
| Carbon dioxide permeability (cc/m² · 24 hr · atm · 20° C. · 90% RH) | 17,700 | 18,900 | 43,300 | 37,200 |
| Anti-fogging property | no fogging | no fogging | no fogging | no fogging |
| Side welding seal strength (kg · cm/15 mm) | 4.6 | 5.6 | 3.3 | 3.5 |
| Remarks | * | ** | * | ** |

| | E | F | G | H |
|---|---|---|---|---|
| Water vapour transmission (g/m² 24 hr · 40° C.) | 105 | 30 | 190 | 65 |
| Oxygen permeability (cc/m² · 24 hr · atm · 20° C. · 90% RH) | 2,800 | 3,200 | 36,200 | 32,000 |
| Carbon dioxide permeability (cc/m² · 24 hr · atm · 20° C. · 90% RH) | 11,400 | 14,100 | 136,000 | 76,000 |
| Anti-fogging property | no fogging | no fogging | no fogging | no fogging |
| Side welding seal strength (kg · cm/15 mm) | 3.1 | 3.6 | 3.1 | 3.3 |
| Remarks | * | ** | * | ** |

*Films for comparative examples
**Films of the present invention

The above-obtained films A to H were formed in bags (100 mm × 180 mm). Kidney bean (70 g) was packaged in these bags and fresh keeping effect of the bags were evaluated according to the same manner as described above. The storage conditions were 35° C. × 70% RH.

The results are shown in Table 9. The films of the present invention (B, D, F, H) show good fresh keeping effect, while the film A shows inferior properties from the viewpoint of looseness and bad odor due to lack of evaporation resulted from too low water vapour transmission. On the other hand, the film C shows discoloration and softening due to a dehydration state resulted from too high water vapour transmission. Further, the film E and G show discoloration due to insufficient respiration resulted from their oxygen and carbon dioxide permeabilities which are outside the ranges of the present invention.

TABLE 9

Vegetable: kidney bean
Storage conditions: 35° C. × 70% RH
Size of bag and content: 180 mm × 280 mm, sealed package,

| Fresh keeping evaluation | Films A | B | C | D | E | F | G | H |
|---|---|---|---|---|---|---|---|---|
| 1 day | | | | | | | | |
| Discoloration | 5 | 5 | 5 | 5 | 5 | 5 | 5 | 5 |
| Softening | 5 | 5 | 5 | 5 | 5 | 5 | 5 | 5 |
| Looseness | 4 | 5 | 5 | 5 | 5 | 5 | 5 | 5 |
| Odor | 3 | 5 | 5 | 5 | 5 | 5 | 5 | 5 |
| 2 days | | | | | | | | |
| Discoloration | 4 | 5 | 3 | 4 | 4 | 4 | 4 | 4 |
| Softening | 5 | 5 | 3 | 4 | 4 | 5 | 4 | 5 |
| Looseness | 2 | 4 | 5 | 5 | 4 | 5 | 5 | 5 |
| Odor | 2 | 4 | 5 | 5 | 4 | 4 | 5 | 5 |
| 4 days | | | | | | | | |
| Discoloration | 3 | 4 | 2 | 3 | 2 | 3 | 2 | 3 |
| Softening | 4 | 5 | 2 | 4 | 3 | 4 | 3 | 4 |
| Looseness | 1 | 3 | 5 | 5 | 3 | 4 | 4 | 4 |
| Odor | 1 | 3 | 5 | 5 | 3 | 3 | 4 | 4 |

EXAMPLE 5

The above-obtained film A to H were formed in bags (100 mm×180 mm) and provided 8 circular perforations of 2 mm in diameter to each surface as shown FIG. 3 (total aperture area of which was corresponding to 0.14% of total area of the bag). Kidney bean (70 g) was packaged in these bags and fresh keeping effect of the bags were evaluated according to the same manner as described above. The storage conditions were 35° C.×70% RH.

The results are shown in Table 10. The films of the present invention (B, D, F, H) show good fresh keeping effect, while the film A shows inferior properties from the viewpoint of looseness and bad odor due to lack of evaporation resulted from too low water vapour transmission. On the other hand, the film C shows discoloration and softening due to a dehydration state resulted from too high water vapour transmission. Further, the film E and G show discoloration due to insufficient respiration resulted from their oxygen and carbon dioxide permeabilities which are outside the ranges of the present invention.

TABLE 10

Vegetable: kidney bean
Storage conditions: 35° C. × 70% RH
Size of bag and content: 180 mm × 280 mm, sealed package,

| Fresh keeping evaluation | Films | | | | | | | |
|---|---|---|---|---|---|---|---|---|
| | A | B | C | D | E | F | G | H |
| 1 day | | | | | | | | |
| Discoloration | 5 | 5 | 5 | 5 | 5 | 5 | 5 | 5 |
| Softening | 5 | 5 | 5 | 5 | 5 | 5 | 5 | 5 |
| Looseness | 5 | 5 | 5 | 5 | 5 | 5 | 5 | 5 |
| Odor | 5 | 5 | 5 | 5 | 5 | 5 | 5 | 5 |
| 2 days | | | | | | | | |
| Discoloration | 4 | 5 | 3 | 4 | 4 | 4 | 4 | 4 |
| Softening | 5 | 5 | 3 | 4 | 4 | 5 | 4 | 4 |
| Looseness | 4 | 4 | 5 | 5 | 4 | 5 | 5 | 5 |
| Odor | 4 | 5 | 5 | 5 | 4 | 5 | 5 | 5 |
| 4 days | | | | | | | | |
| Discoloration | 3 | 4 | 1 | 3 | 2 | 3 | 2 | 3 |
| Softening | 4 | 4 | 1 | 3 | 3 | 4 | 2 | 3 |
| Looseness | 2 | 4 | 5 | 5 | 3 | 5 | 5 | 5 |
| Odor | 2 | 4 | 5 | 5 | 3 | 4 | 5 | 5 |

EXAMPLE 6

The above-obtained films A to H were formed in bags (100 mm×180 mm) and provided two cutout parts at the both corners of the bottom side (remaining sealed area at the bottom: 92.9%). Kidney bean (70 g) was packaged in these bags and fresh keeping effect of the bags were evaluated according to the same manner as described above. The storage conditions were 36° C.×70% RH.

The results are shown in Table 11. The films of the present invention (B, D, F, H) show good fresh keeping effect, while the film A shows inferior properties from the viewpoint of looseness and bad odor due to lack of evaporation resulted from too low water vapour transmission. On the other hand, the film C shows discoloration and softening due to a dehydration state resulted from too high water vapour transmission. Further, the film E and G show discoloration due to insufficient respiration resulted from their oxygen and carbon dioxide permeabilities which are outside the ranges of the present invention.

TABLE 11

Vegetable: kidney bean
Storage conditions: 35° C. × 70% RH
Size of bag and content: 180 mm × 280 mm, sealed package,

| Fresh keeping evaluation | Films | | | | | | | |
|---|---|---|---|---|---|---|---|---|
| | A | B | 0 | 0 | E | F | G | H |
| 1 day | | | | | | | | |
| Discoloration | 5 | 5 | 5 | 5 | 5 | 5 | 5 | 5 |
| Softening | 5 | 5 | 5 | 5 | 5 | 5 | 5 | 5 |
| Looseness | 5 | 5 | 5 | 5 | 5 | 5 | 5 | 5 |
| Odor | 5 | 5 | 5 | 5 | 5 | 5 | 5 | 5 |
| 2 days | | | | | | | | |
| Discoloration | 4 | 5 | 3 | 4 | 4 | 4 | 4 | 4 |
| Softening | 5 | 5 | 3 | 4 | 4 | 5 | 4 | 5 |
| Looseness | 4 | 4 | 5 | 5 | 4 | 5 | 5 | 5 |
| Odor | 3 | 5 | 5 | 5 | 4 | 5 | 5 | 5 |
| 4 days | | | | | | | | |
| Discoloration | 3 | 4 | 1 | 3 | 2 | 3 | 2 | 3 |
| Softening | 4 | 5 | 2 | 3 | 3 | 4 | 2 | 4 |
| Looseness | 2 | 4 | 5 | 5 | 3 | 4 | 5 | 5 |
| Odor | 1 | 4 | 5 | 5 | 3 | 4 | 5 | 5 |

As described herein above, since the film of the present invention has proper water vapour transmission, and oxygen and carbon dioxide permeabilities, vegetables and fruits can maintain their vital physiological activities. Thus, the film of the present invention shows excellent fresh keeping effect. Further, since the film of the present invention has excellent anti-fogging property and excellent anti-fogging property duarability, fogging is effectively prevented to maintain good appearance and good commercial value of vegetables and fruits packaged and wet rot due to condensed water at a fogged part can be efficiently prevented. Thus, according to the present invention, it is possible to supply consumers with fresh vegetables and fruits.

In addition, even in the case of vegetables and fruits which maintain vigorous physiological activities, excellent fresh keeping effect can be obtained by providing perforation or cutout. Further, even if condensed water is formed due to temperature change, water can be removed through the perforation or cutout part to prevent wet rot. Further, since the film of the present invention is a multilayered one, it is hardly broken even if perforation or cutout is provided.

What is claimed is:

1. A biaxially oriented anti-fogging, multi-layered film comprising a base layer and at least one surface layer containing an anti-fogging agent, said film having a water vapour transmission of 15 to 200 g/m$^2$·24 hr·40° C., an oxygen permeability of 3,000 to 35,000 cc/m$^2$·24 hr·atm·20° C.·90% RH, and a carbon dioxide permeability of 12,000 to 130,000 cc/m$^2$·24 hr atm·20° C.·90% RH, said anti-fogging surface layer having heat sealing properties such that the film shows a side welding seal strength of at least 3.0 kg·cm/15 mm when side welding seal is carried out at 270° C., and at least one surface layer of said film showing an anti-fogging property when exposed to two cycles of temperature rise and drop between 20° C. and 40° C., the temperature rises and drops occurring at 6 hour intervals.

2. A film according to claim 1, wherein the surface layer having heat sealing property is mainly composed of a polymer selected from the group consisting of a homopolymer or copolymer of α-olefins having a melting point of 80° to 155° C. and mixtures thereof.

3. A film according to claim 2, wherein α-olefin is selected from those having 2 to 10 carbon atoms.

4. A film according to claim 2, wherein the surface layer is mainly composed of a random or block copolymer of α-olefins having 2 to 10 carbon atoms.

5. A film according to claim 1, wherein the base layer comprises a mixture of (a) 30 to 90% by weight of a polymer or copolymer of one or more α-olefins having 2 to 10 carbon atoms and (b) 10 to 70% by weight of one or more copolymers which contain one or more monomer units selected from the group consisting of vinyl acetate, acrylic acid and styrene in an amount of 5 to 80% by weight, and other copolymerizable monomer units in an amount of 95 to 20% by weight based on the total constituent components.

6. A film according to claim 1, wherein the anti-fogging agent is contained in an amount of 0.3 to 3% by weight based on the total weight of the film.

7. A film according to claim 1, wherein the anti-fogging agent is contained at least in one surface layer of the film in an amount of 0.3 to 3% by weight.

8. A film according to claim 1, wherein at least one surface layer of the film shows an anti-fogging property when exposed to two cycles of temperature rise and drop between 0° C. and 40° C, the temperature rises and drops occurring at 6 hour intervals.

* * * * *